US009609371B2

(12) United States Patent
Liang et al.

(10) Patent No.: US 9,609,371 B2
(45) Date of Patent: Mar. 28, 2017

(54) ONLINE VIDEO PLAYING METHOD AND VIDEO PLAYING SERVER

(71) Applicant: TENCENT TECHNOLOGY (SHENZHEN) COMPANY LIMITED, Shenzhen (CN)

(72) Inventors: Feng Liang, Shenzhen (CN); Qifei Cheng, Shenzhen (CN); Hao Hu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 239 days.

(21) Appl. No.: 14/227,895

(22) Filed: Mar. 27, 2014

(65) Prior Publication Data

US 2014/0215545 A1 Jul. 31, 2014

Related U.S. Application Data

(63) Continuation of application No. PCT/CN2012/080421, filed on Aug. 21, 2012.

(30) Foreign Application Priority Data

Sep. 27, 2011 (CN) .......................... 2011 1 0296861

(51) Int. Cl.
*H04N 21/238* (2011.01)
*H04N 21/2385* (2011.01)
*H04N 21/845* (2011.01)

(52) U.S. Cl.
CPC ....... *H04N 21/2385* (2013.01); *H04N 21/238* (2013.01); *H04N 21/8456* (2013.01)

(58) Field of Classification Search
CPC .......................... H04N 21/2385; H04N 21/238
See application file for complete search history.

(56) References Cited

U.S. PATENT DOCUMENTS

2005/0114538 A1* 5/2005 Rose ....................... H04L 29/06
709/231
2006/0218220 A1* 9/2006 Ganesan ............ H04N 7/17318
709/200

(Continued)

FOREIGN PATENT DOCUMENTS

CN 101009655 A 8/2007
CN 101217638 A 7/2008

(Continued)

OTHER PUBLICATIONS

CN Office Action issued Aug. 24, 2015 re: Application No. 201110296861.5; pp. 1-9.
International Preliminary Report on Patentability issued Apr. 10, 2014 re: Application No. PCT/CN2012/080421; pp. 1-22.
International Search Report issued Nov. 29, 2012 re: PCT/CN2012/080421; citing: CN101345852A, CN101431771A, CN101795264A, CN101009655A.

(Continued)

*Primary Examiner* — Robert Hance
(74) *Attorney, Agent, or Firm* — Cantor Colburn LLP

(57) ABSTRACT

The present invention discloses a method for playing online video and a video playing server thereof. This method includes: splitting a video play file into multiple sequentially connected video segments; receiving a video downloading request from a user, obtaining a video segment corresponding to positioning information carried in the video downloading request, and returning content of the video segment corresponding to the positioning information to a client; and confirming that returning content of the current video segment is finished, and releasing bandwidth resources occupied by the user. By applying the present invention, the bandwidth utilization rate can be improved and the bandwidth resource pressure of the video playing server can be decreased.

12 Claims, 3 Drawing Sheets

(56) References Cited

U.S. PATENT DOCUMENTS

| | | | | |
|---|---|---|---|---|
| 2008/0075116 A1* | 3/2008 | Holierhoek | ......... | H04L 12/5695 370/468 |
| 2010/0067525 A1* | 3/2010 | Matsui | ................ | H04L 12/5695 370/389 |
| 2010/0299552 A1* | 11/2010 | Schlack | .................. | H04L 47/10 714/4.1 |
| 2011/0296109 A1* | 12/2011 | Sood | .................. | H04N 21/4331 711/118 |
| 2012/0226665 A1 | 9/2012 | Li et al. | | |

FOREIGN PATENT DOCUMENTS

| | | |
|---|---|---|
| CN | 101345852 A | 1/2009 |
| CN | 101345853 A | 1/2009 |
| CN | 101431771 A | 5/2009 |
| CN | 101795264 A | 8/2010 |
| CN | 101917388 A | 12/2010 |
| CN | 102088623 A | 6/2011 |

OTHER PUBLICATIONS

International Search Report issued Nov. 29, 2012 re: PCT/CN2012/080421; citing: CN101345852A, CN101431771A, CN101795264A, and CN101009655A.
English Translation of Abstract of CN101345852A.
English Translation of Abstract of CN101431771A.
English Translation of Abstract of CN101795264A.
English Translation of Abstract of CN101009655A.

\* cited by examiner

ONLINE VIDEO PLAYING METHOD AND VIDEO PLAYING SERVER

CROSS REFERENCE TO RELATED APPLICATIONS

This application is a continuation of International Patent Application Number PCT/CN2012/080421 filed on Aug. 21, 2012 which claims the benefit of Chinese Patent Application No. 201110296861.5, filed on Sep. 27, 2011, and entitled "online video playing method and video playing server", the disclosures of both of said applications are herein incorporated by reference in their entirety.

TECHNICAL FIELD

The present invention relates to digital multimedia technologies, especially to an online video playing method and a video playing server.

BACKGROUND

With the development of computer communication technologies, internet technologies and multimedia technologies, watching online videos is being applied more and more widely. A user can select any time slot to, by establishing a network connection with a video playing server through a client, watch various types of videos provided by the video playing server, for example, movies, TV series or Flash videos. He can select his preferred video play file, click it, download it on line, play it, and watch it, so as to enjoy various video extension services provided by a digital multimedia operator through the video playing server.

FIG. 1 is a schematic diagram illustrating a flowchart of an online video playing method in the traditional art. With reference to FIG. 1, the flow includes the following process.

At block 101, the video playing server stores various kinds of videos in advance.

In this block, the video playing server provides video play files such as movies, TV series, Flash videos and so on. For example, each movie or each episode of a TV series is stored as a video play file.

At block 102, the video playing server establishes a network connection with the client.

In this block, if the user needs to watch an online video, he can establish a network connection with the video playing server through the client so as to obtain a video play file he wants to watch.

At block 103, a video downloading request from the user is received, and a video play file corresponding to the video downloading request is returned to the user and is played by a video player on the client.

In this block, the video playing server receives the video downloading request from the user, allocates bandwidth transmission resources for the user, and returns the video play file corresponding to the video downloading request to the client via the allocated bandwidth transmission resources. The allocated bandwidth transmission resources can guarantee that a transmission rate of the corresponding video play file is larger than a playing rate of the video play file. After the client receives the returned playable video play file, plays it. In this way, by way of playing while downloading, waiting time of the user is efficiently saved.

It can be seen from the above that, in the traditional online video playing method, after the network connection is established with the video playing server, the user can download a video play file that he wants to watch and play it online. In this process, the user always occupies the bandwidth resources provided by the video playing server. If a lot of users centrally download a certain hot video and play it at the same time, this will cause the time of downloading the video is relatively centralized so that the pressure of the bandwidth resources of the video playing server is relatively heavy; meanwhile, under the condition that the bandwidth resources of the video playing server are limited, other users need to wait to access the video playing server to perform their downloading until playing of the video play file of the user who occupies the bandwidth resources is finished and the connection to the video playing server is exited to release the occupied bandwidth resources. However, during the period from finishing downloading the video play file to finishing playing the video play file, the bandwidth resources of the user are always in an idle status, which makes the resource utilization rate being relative low and the number of accessing users being relatively small; further, a user may need not watch a whole video play file, however, in the conventional art, he needs to download the whole video play file, which causes unnecessary network flow overhead, and causes the costs of the user watching online video to be relatively high.

SUMMARY OF THE INVENTION

In view of this, an object of the present disclosure is to provide an online video playing method to improve bandwidth utilization rate and reduce bandwidth resource pressure of the video playing server.

Another object of the present disclosure is to provide a video playing server to improve bandwidth utilization rate and reduce bandwidth resource pressure of the video playing server.

To achieve the above objects, an aspect of the present disclosure provides an online video playing method, this method including: splitting a video play file into multiple sequentially connected video segments; receiving a video downloading request from a user, obtaining a video segment corresponding to positioning information carried in the video downloading request, and returning content of the video segment corresponding to the positioning information to a client; and confirming that returning the content of the current video segment is finished, and releasing bandwidth resources occupied by the user.

Another aspect of the present disclosure also provides a video playing server. The video playing server includes: a video segment splitting module, a video segment downloading module and a bandwidth resource processing module.

The video segment splitting module splits and saves a video play file into multiple sequentially connected video segments.

The video segment downloading module, after receiving a video downloading request from a user, obtains a video segment corresponding to positioning information carried in the video downloading request, and returns content of the video segment content corresponding to the positioning information saved in the video segment splitting module to the client; receives a notification message of pushing a next video segment, and returns a video segment next to the video segment that currently has been pushed.

The bandwidth resource processing module confirms that returning current video segment by the video segment downloading module is finished, and releases bandwidth resources occupied by this user; receives a notification message, restore bandwidth resources occupied by the user, and after the bandwidth resources occupied by the user is restored, sends a notification message of pushing a next video segment to the video segment downloading module.

It can be seen from the above technical scheme that, the examples of the present disclosure provides an online video playing method and a video playing server, including: splitting a video play file into multiple sequentially connected video segments; receiving a video downloading request from a user, obtaining a video segment corresponding to positioning information carried in the video downloading request, and returning content of the video segment corresponding to the positioning information to a client; and confirming that returning the content of the current video segment is finished, and releasing bandwidth resources occupied by the user. Therefore, by splitting a video play file into video segments, downloading the video in unit of the split video segments, and releasing bandwidth resources occupied within the time period of after finishing downloading the video play file and before finishing playing the video play file for other clients waiting to connect to the video playing server to use, this can increase the number of connected users efficiently, improve utilization rate of resources and reduce bandwidth resource pressure of the video playing server.

DETAILED DESCRIPTION

To make object, technical scheme and advantage of the present invention clearer, the present invention will be described in further detail with reference to the drawings and specific embodiments.

In the conventional art, the video playing server pushes a video to the client in unit of video play files, but since the pushing rate is larger than the video playing rate, bandwidth transmission resources allocated to the client are in an idle status and cannot be utilized during a certain period, which then leads to a low utilization rate of the resources. In examples of the present disclosure, by splitting a video play file into video segments and taking the split video segments as the unit to download, after a current video segment is downloaded completely, the occupied bandwidth resources are released for other users to use, and when play progress of the current video segment is larger than preconfigured play progress, the bandwidth resources of the user are restored to download a next video segment, so that other users can use the interval between the two video segments to perform downloading.

Figure 1:
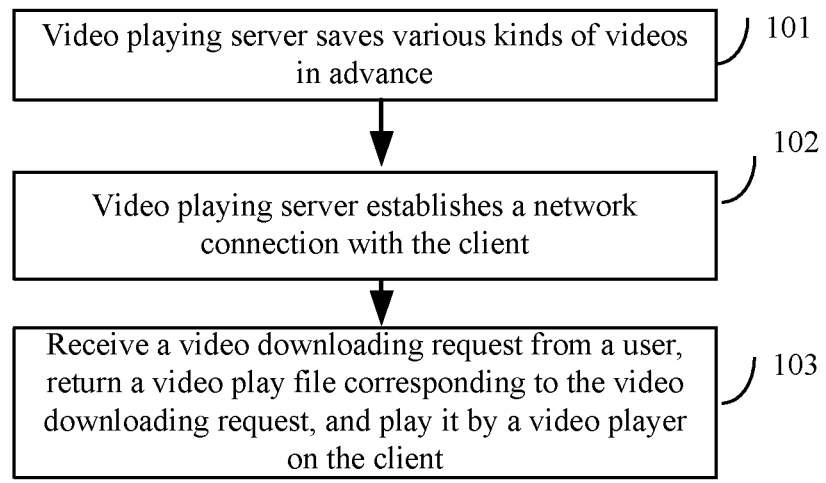
FIG. 1 shows a schematic diagram illustrating a flowchart of an online video playing method of the traditional art.
Figure 2:
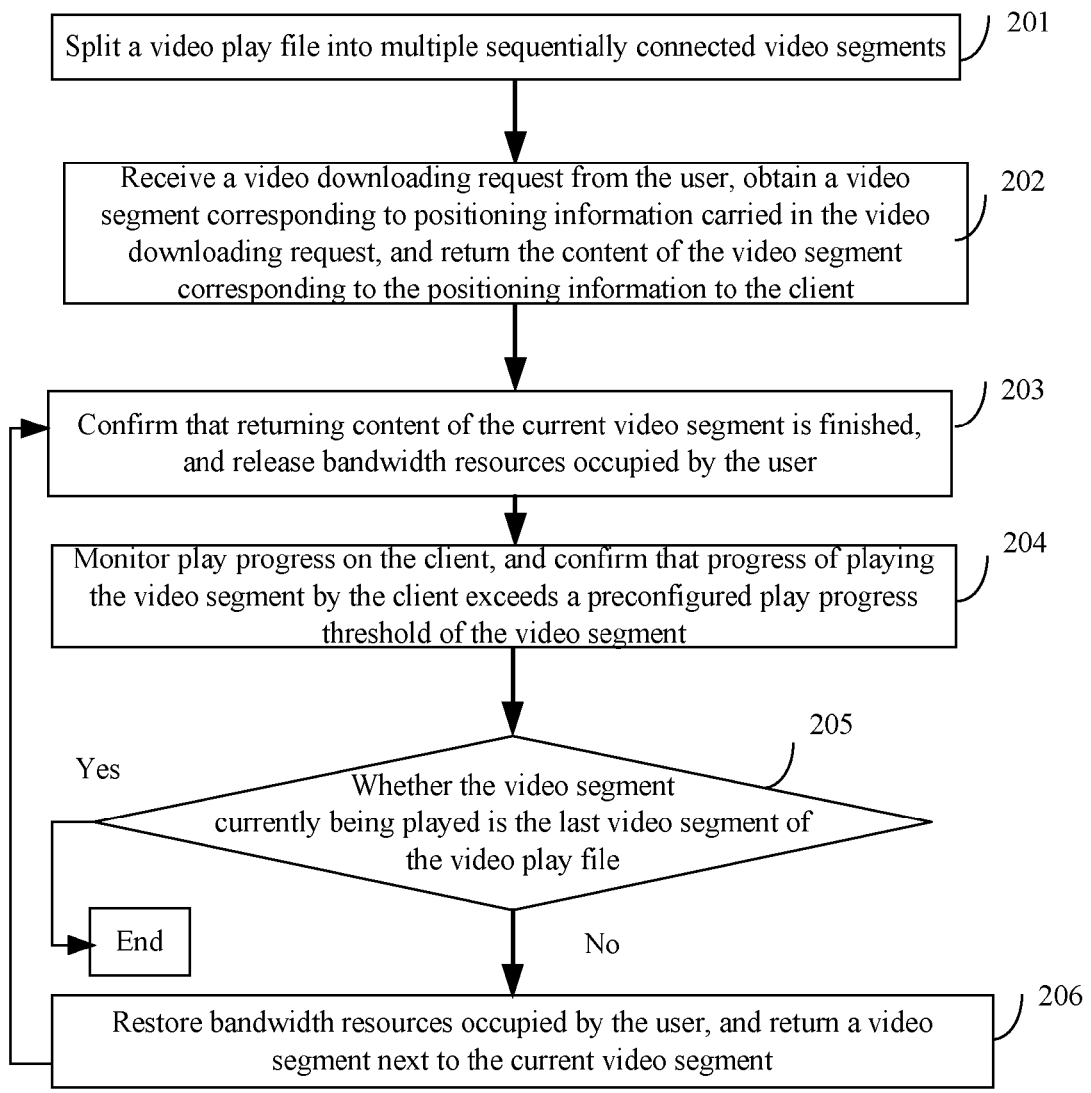
FIG. 2 shows a schematic diagram illustrating a flowchart of an online video playing method according to an example of the present disclosure.

FIG. 2 is a schematic diagram illustrating a flowchart of an online video playing method according to an example of the present disclosure. Referring to FIG. 2, the flow includes the following process.

At block 201, a video play file is split into multiple sequentially connected video segments.

In this block, the video play file is segmented and split into multiple sequentially connected playable video play sub-files (video segments). The video play file can be split according to one of or any combination of highlights, video plot developments, spatial conversion or time course contained in the video play file, so that one video play file can be split into multiple sequentially connected video segments, and the respective split video segments are independent of one another.

Preferably, taking a Flash player as an example, the play time length of each split video segment is about 5 to 7 minutes, or the size of each sub-file is 12 MB to 20 MB. If it is a Windows application, the play time length of each split video segment may be even larger.

In practical application, after a video play file is split, according to play time lengths of split video segments, a play time length contained in a video play file can be further split, and a video segment identification can be set for each video segment to correspond to a position of the play time length accordingly and is shown on a video play window.

Figure 3:
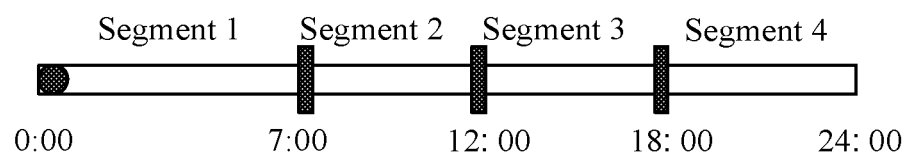
FIG. 3 shows a schematic diagram illustrating play time lengths corresponding to split video play files according to an example of the present disclosure.

FIG. 3 is a schematic diagram illustrating play time lengths corresponding to split video play files according to an example of the present disclosure. With reference to FIG. 3, a video play file is split into 4 video segments, which are segment 1, segment 2, segment 3 and segment 4 (video segment identifications), and play start time of each video segment is based on play end time of a previous adjacent video segment. For example, assuming that play time lengths of segment 1 to segment 4 are 7 minutes, 5 minutes, 6 minutes and 6 minutes respectively, and sizes of corresponding video segments are 20 MB, 15 MB, 18 MB and 18 MB, and assuming that play start time of segment 1 is 0 and play end time of it is 7:00; then play start time of segment 2 is 7:00 and play end time is 12:00; play start time of segment 3 is 12:00 and play end time is 18:00; play start time of segment 4 is 18:00 and play end time is 24:00.

At block 202, a video downloading request is received from the user, a video segment corresponding to positioning information carried in the video downloading request is obtained, and the content of the video segment corresponding to the positioning information is returned to the client.

In this block, the positioning information includes play time point information or plot development information. Preferably, in this example of the present disclosure, if the positioning information is play time point information, then specifically obtaining a video segment corresponding to the positioning information carried in the video downloading request and returning the content of the video segment corresponding to the position information to the client is: obtaining a play time point of the video segment in the video play file corresponding to the video downloading request, and returning the content of the video segment after the play time point to the client.

If the user wants to watch a video online, a network connection to the video playing server is established through the client, and a video downloading request that carries play time point information is sent to the video playing server. For example, the client shows a video play window by receiving information of clicking a video play file to play it inputted by the user and triggers output of the video downloading request to the video playing server by receiving information of clicking a start-to-play button in the video play window inputted by the user so as to obtain the video play file that needs to be watched and play it. The play time point information carried in the video downloading request is determined according to the position of the play progress on the play time length shown in the video play window, and for detailed information please refer to related technical documents, which will not be elaborated herein. In this way, the user needs only to download a video file he wants to watch instead of downloading a whole video play file. For example, if the user only wants to watch the first half of a movie, in the example of the present disclosure, by splitting a complete movie into independent first half movie video segment and last half movie video segment, the last half movie video segment will not be downloaded, which dramatically reduces waste of unnecessary traffic and bandwidth.

In the example of the present disclosure, the video playing server can determine which video segment to be returned and from which position the video segment is returned according to the play time point information carried in the video downloading request. For example, as shown in FIG. 3, if the play time point information carried in the video downloading request is 0, then the video playing server returns the whole file of segment 1, if the play time point information carried in the video downloading request is 15:30, the video playing server learns that the video segment to be returned is segment 3, and returns the video from 15:30 of the video play file to 18:00 of the video play file.

At block 203, it is confirmed that returning content of the current video segment is finished, and bandwidth resources occupied by the user are released.

In this block, a video play file is downloaded segment by segment, and after downloading a current video segment is finished, bandwidth resources occupied by the user are released. In this way, since the downloading rate of the video file is larger than the playing rate of the video file, therefore, during the period of after finishing downloading the current video segment and before finishing playing the current video segment, by maintaining the network connection of the client, the bandwidth resources occupied by the client can be released for other clients that wait to access to the video playing server to use, so as to alleviate the technical problem of heavy bandwidth resource pressure of the video playing server that is incurred because of intensive video downloading time, efficiently increase the number of accessing users and improve the utilization rate the resources.

By now, the online video playing method provided by embodiment of the present invention ends.

Preferably, this method may further include the following process.

At block 204, play progress on the client is monitored, and it is confirmed that progress of playing the video segment by the client exceeds a preconfigured play progress threshold of the video segment.

In this block, the process of monitoring the play progress on the client includes the following process.

The client reports play progress at a preconfigured time period after starting playing the video segment, and the video playing server obtains the reported the play progress on the client.

Or the video playing server returns preconfigured play progress thresholds of respective video segments to the client, and after the client starts playing a video segment, if current play progress exceeds a preconfigured play progress threshold of this video segment, the client reports information of the play progress exceeding the preconfigured play progress threshold to the video playing server. According to this information of the play progress exceeding the preconfigured play progress threshold, the video playing server confirms that progress of the video segment played by the client exceeds the preconfigured play progress threshold of this video segment.

The play progress threshold can be a current total play time length of the video play file, or current play time lengths of the respective video segments, or current play completion ratios of the respective video segments. For example, assuming that the play progress threshold is a current total play time length of the video play file, as shown in FIG. 3, the first play progress threshold to the fourth play progress threshold can be set and correspond to the play progress thresholds of the segments 1 to 4. For example, assuming that the first play progress threshold is set to be 06:30, the second play progress threshold is set to be 11:30, the third play progress threshold is set to be 17:30, and the fourth play progress threshold is set to be 23:30, then when the progress of the video segment being played by the client exceeds 06:30, it is confirmed that the progress of the video segment being played by the client exceeds the first play progress threshold, as so on, and when the progress of the video segment being played by the client exceeds 23:30, it is confirmed that the progress of the video segment being played by the client exceeds the fourth play progress threshold.

At block 205, it is determined whether the video segment currently being played is the last video segment of the video play file, and if it is, this process ends, or otherwise, block 206 is executed.

In this block, as shown in FIG. 3, if the video segment currently being played is any one of the segments 1 to 3, then block 206 is executed, and if the video segment currently being played is the segment 4, it means that playing the last video segment of the video play file is finished, and this process ends. In this way, a next video segment to play will not be downloaded until playing of a current video segment is to be finished, which significantly opening the time of centrally downloading from the video playing server and efficiently alleviates the pressure of the video playing server.

At block 206, the bandwidth resources occupied by this user are restored, and a video segment next to the current video segment is returned, and block 203 is returned to and executed.

In this block, if the user compulsively exits during a play process, the processing flows at the client and at the video playing server are same to that in traditional arts, which will not be elaborated herein.

In the examples of the present disclosure, a video play file can be split formally only. In this way, after playing a current video segment is finished, the client can directly continue to play a next video segment. Of course, in practical application, a video play file can also be split substantially, for example, contents of a package header and a package tail of a split video segment are encapsulated respectively. In this way, after the client finishes playing a current video segment, it can skip to a next video segment to play according to content of the encapsulated package tail.

In the examples of the present disclosure, video segments are played one by one according to preconfigured control logic, and when a user starts to watch a video, only a video segment that the user watches will be downloaded (for example, segment 1), and when playing the video segment currently being played is to be finished soon (for example, it can be configured that remaining play time is half a minute), a next video segment (segment 2) is started to load, but is not allowed to be played nor be placed in the video play window that the user can see until a moment when finishing playing the current video segment (segment 1) is confirmed, a video segment (segment 2) that has been being downloaded for a while and can be played is switched to the video play window, and the previous video segment is removed from the video play window. Since the running speed is relatively fast, the user is hardly aware of the switching process for the two internal playing objects. Furthermore, by connecting multiple video segments to play, the pressure of the video playing server is efficiently alleviated, the bandwidth is saved, and meanwhile, the user experience is not affected, which can exert features of a flash video, such as flexibility, interactivity, etc., thus improving the whole video playing experience.

Figure 4:
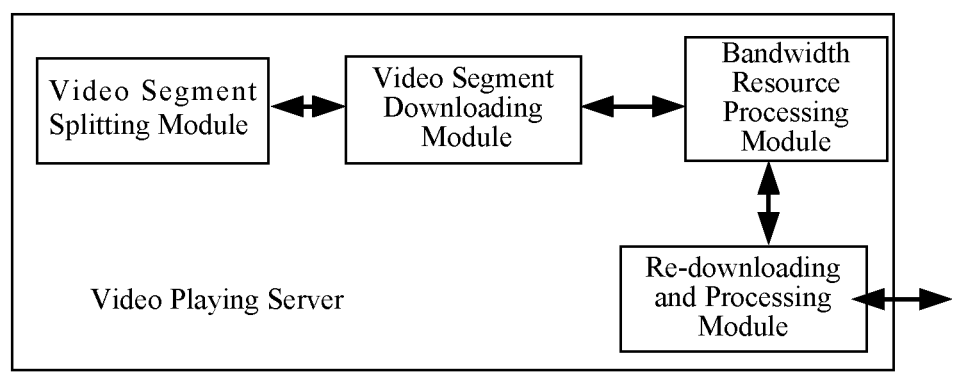
FIG. 4 shows a structural schematic diagram of a video playing server according to an example of the present disclosure.

FIG. 4 shows a structural schematic diagram of a video playing server according to an example of the present invention. With reference to FIG. 4, this video playing server includes: a video segment splitting module, a video segment downloading module and a bandwidth resource processing module.

The video segment splitting module splits and saves a video play file into multiple sequentially connected video segments.

In an example of the present invention, a video play file can be split according to a preconfigured strategy, and the preconfigured strategy can be splitting a video play file according to highlights, video plot developments, spatial conversion or time course contained in the video play file.

The video segment downloading module, after receiving a video downloading request from the user, obtains a video segment corresponding to positioning information carried in the video downloading request, and returns the content of the video segment corresponding to the positioning information saved by the video segment splitting module to the client; receives a notification message of pushing a next video segment, and returns a video segment next to the video segment that currently has been pushed.

In an example of the present disclosure, as described above, if the positioning information is play time point information, then specifically obtaining a video segment corresponding to the positioning information carried in the video downloading request and returning the content of the video segment corresponding to the position information saved by the video segment splitting module to the client is: obtaining a play time point of the video segment in the video play file corresponding to the video downloading request, and returning the content of the video segment after the play time point saved by the video segment splitting module to the client. In this way, the video playing server can make sure which video segment needs to be returned and from which position this video segment is to be returned according to the play time point information carried in the video downloading request.

The bandwidth resource processing module confirms that the video segment downloading module has finished returning the current video segment and released bandwidth resources occupied by the user; and receive a notification message, restore bandwidth resources occupied by the user, and after the bandwidth resources occupied by the user are restored, send a notification message of pushing a next video segment to the video segment downloading module.

The video playing server may further include a re-downloading and processing module, to monitor play progress of the client, and after confirming that progress of playing the video segment by the client exceeds a preconfigured play progress threshold of this video segment, and confirming that the video segment currently being played is not the last video segment of the video play file, send a notification message to bandwidth resource processing module.

The re-downloading and processing module includes: a play progress monitoring unit, a video segment confirmation unit, a play progress determination unit and a re-downloading and processing unit (which is not shown in the figure).

The playing progress monitoring unit monitors and obtains play progress of the client.

The video segment confirmation unit confirms a video segment currently being played according to the play progress obtained by the play progress monitoring unit.

The play progress determination unit determines whether the progress of the video segment currently being played exceeds the preconfigured play progress threshold of this video segment, and if it does, outputs information of the video segment to the re-downloading and processing unit, or otherwise, performs no process.

The re-downloading and processing unit confirms whether the video segment corresponding to the received video segment information is the last video segment of the video play file, and if it is not, sends a notification message to the bandwidth resource processing module, and if it is, performs no process.

The above description is just examples of the present invention and should not be construed as limitations to the protection scope of the present disclosure. Any modification, equivalent replacement and improvement made within the spirit and scope of the present disclosure should be contained in the protection scope of the present disclosure.

What is claimed is:

1. An online video playing method, comprising:
    splitting a video play file into multiple sequentially connected video segments;
    receiving a video downloading request, obtaining a video segment corresponding to positioning information carried in the video downloading request, and returning the video segment corresponding to the positioning information to a client;
    confirming that returning the video segment is finished, and releasing bandwidth resources occupied by the client; and
    monitoring play progress on the client, confirming that play progress of the video segment currently being played on the client exceeds a preconfigured play progress threshold of the video segment and that the video segment currently being played is not a last video segment of the video play file, restoring the released bandwidth resources previously occupied by the client, and returning a video segment next to the video segment currently being played.

2. The method according to claim 1, wherein the method further comprises:
    splitting a play time length contained in the video play file into play time lengths of the multiple video segments sequentially.

3. The method according claim 2, wherein the positioning information comprises play time point information or plot development information.

4. The method according to claim 3, wherein receiving the video downloading request comprises:
    establishing a network connection with the client by the video playing server;
    receiving information of clicking a video play file to play and showing a video play window by the client; and
    receiving information of clicking a start-to-play button in the video play window to trigger output of the video downloading request to the video playing server by the client, the video play request carrying play time point information, and the video playing server receiving the video downloading request from the client.

5. The method according to claim 1, wherein monitoring the play progress on the client comprises:
reporting the play progress at a preconfigured time period after starting to play the video segment by the client, and obtaining the reported play progress on the client by the video playing server.

6. The method according to claim 1, wherein monitoring the play progress on the client comprises:
returning preconfigured play progress thresholds of the multiple video segments to the client by the video playing server, and after the client starting to play the video segment, in response to determining that the play progress exceeds the preconfigured play progress threshold of the video segment, the client reporting information of the play progress exceeding the preconfigured play progress threshold to the video playing server.

7. The method according to claim 1, wherein splitting the video play file is performed according to one of or any combination of highlights, video plot developments, spatial conversion or time course contained in the video play file.

8. The method according to claim 1, wherein the method further comprises:
splitting a play time length contained in the video play file into play time lengths of the multiple video segments sequentially.

9. The method according claim 8, wherein the positioning information comprises play time point information or plot development information.

10. The method according to claim 1, wherein splitting the video play file is performed according to one of or any combination of highlights, video plot developments, spatial conversion or time course contained in the video play file.

11. A video playing server, comprising: a processor and a non-transitory computer readable storage medium having stored thereon instructions that, when executed by the processor, cause the processor to:
split and save a video play file into multiple sequentially connected video segments;
receive a video downloading request, obtain a video segment corresponding to positioning information carried in the video downloading request, and return the video segment corresponding to the positioning information to a client;
confirm that returning the video segment is finished, and in response release bandwidth resources occupied by the client; and
restore the released bandwidth resources previously occupied by the client, and return a video segment temporally subsequent to the video segment that was returned prior to the bandwidth resources being released.

12. The video playing server according to claim 11, wherein the non-transitory computer readable storage medium further has stored thereon instructions that, when executed by the processor, cause the processor to: before restoring the bandwidth resources occupied by the client,
monitor play progress on the client, and confirm that play progress of the video segment currently being played on the client exceeds a preconfigured progress threshold of the video segment, and that the video segment currently being played is not a last video segment in the video play file.

* * * * *